United States Patent
Mincher et al.

[11] Patent Number: 6,132,561
[45] Date of Patent: Oct. 17, 2000

[54] PROCESS FOR THE SOLVENT EXTRACTION FOR THE RADIOLYSIS AND DEHALOGENATION OF HALOGENATED ORGANIC COMPOUNDS IN SOILS, SLUDGES, SEDIMENTS AND SLURRIES

[76] Inventors: Bruce J. Mincher, 3705 Creekside Dr., Idaho Falls, Id. 83404; Randy Dale Curry, 1104 Merrill Ct., Columbia, Mo. 65203; Thomas E. Clevenger, 2512 Bluff Blvd., Columbia, Mo. 65201; Jeffry Golden, 12612 Cedarbrook La., Laurel, Md. 20708

[21] Appl. No.: 09/168,894

[22] Filed: Oct. 9, 1998

Related U.S. Application Data

[60] Provisional application No. 60/062,820, Oct. 13, 1997.

[51] Int. Cl.$^7$ ............... C07C 1/00; A62D 3/00; G01V 5/00
[52] U.S. Cl. ............... 204/157.15; 588/17; 588/210; 250/253
[58] Field of Search .............. 588/200, 210, 588/17; 204/157.15, 164; 436/28; 250/253; 422/186.04

[56] References Cited

U.S. PATENT DOCUMENTS

| | | | |
|---|---|---|---|
| 4,144,152 | 3/1979 | Kitchens | 204/158 R |
| 4,842,448 | 6/1989 | Koerner et al. | 405/258 |
| 5,311,566 | 5/1994 | Curry et al. | 378/64 |
| 5,512,253 | 4/1996 | Woodbridge et al. | 422/186 |
| 5,561,065 | 10/1996 | Schabron | 436/28 |
| 5,799,257 | 8/1998 | Meikrantz et al. | 588/200 |

*Primary Examiner*—Kathryn Gorgos
*Assistant Examiner*—Edna Wong
*Attorney, Agent, or Firm*—Roylance, Abrams, Berdo & Goodman, L.L.P.

[57] ABSTRACT

A process of extracting halogenated organic compounds, and particularly PCBs, from soil, sediment, slurry, sludge and dehalogenating the compounds contacting a contaminated soil sample with an extraction medium of a mixture of an alkane and a water miscible alcohol. The organic compounds dissolve in the extraction medium which is separated from the soil by passing water upwardly through the soil. The extraction medium floats to the surface of the water and is separated. Thereafter, the extraction medium containing the halogenated organic contaminants is subjected to ionizing radiation to radiolytically dehalogenate the compounds.

33 Claims, 8 Drawing Sheets

SOIL SPIKED WITH AROCLOR 1260

SOIL SPIKED WITH AROCLOR 1260

PROCESS FOR THE SOLVENT EXTRACTION FOR THE RADIOLYSIS AND DEHALOGENATION OF HALOGENATED ORGANIC COMPOUNDS IN SOILS, SLUDGES, SEDIMENTS AND SLURRIES

RELATED APPLICATION

This application claims the benefit under 35 U.S.C. § 119(e) of U.S. Provisional Application No. 60/062,820 filed Oct. 13, 1997.

The U.S. Government may have certain rights in this application pursuant to Contract No. DE-AC07-94ID13223 between the U.S. Department of Energy and Idaho National Engineering Laboratory.

FIELD OF INVENTION

The present invention relates to a process for extracting halogenated organic compounds, and particularly polychlorinated-biphenyls (PCB's) from soils, sludges, sediments and slurries, and radiolytically dehalogenating and destroying the halogenated organic compounds with ionizing radiation.

BACKGROUND OF THE INVENTION

PCB's and other halogenated organic compounds are hazardous contaminants in soils, sludges, sediments and slurries. During the past three decades, studies performed on the toxicological effects of these compounds led to a ban on the use of PCB's and a ban, curtailment, or restrictions on the use of many other halogenated organic compounds. While the manufacture of PCB's is now prohibited in the United States, the size of the environmental burden in water, sediments, soil, disposal sites, and in electrical transformers is large. The National Academy of Sciences has estimated this burden at 1.25 billion pounds. For nearly 50 years, until the cessation of production in 1977, industry manufactured and used PCB's in the United States. The properties that made PCB's desirable for industrial applications, i.e., their chemical and thermal stability, as well as their non-flammability, are the same characteristics that make them a persistent problem in today's environment. The inherent thermal and chemical stability of PCB compounds also make them resistant to acid base reactions, hydrolysis, chemical oxidation, photo-degradation, and thermal changes. Today, PCB's are still found in electrical lighting ballasts, electrical transformers, and capacitors manufactured before the ban of PCB's in 1977. Moreover, as a result of manufacturing operations, spills and the disposal of electrical equipment, large areas of soil and sediment are also contaminated with PCB's. The contaminated material includes sediments and sludges in harbors, waterways, wetlands, and wastewater settling and discharge areas.

The U.S. Environmental Protection Agency has recommended a number of alternate treatment methods for PCB's. The most widely used method is incineration. Other methods include biological treatment, solidification, vitrification, treatment with potassium polyethylene glycolate (KPEG), solvent washing/extraction, and adsorption on granular activated carbon. Incineration is used for PCB contaminated soil, sediment, and liquids. However, it suffers from high cost and public resistance because of residues and stack emissions that may be contaminated with hazardous products of incomplete combustion or combustion by-products.

Two emerging technologies that are gaining acceptance include biological treatment and solvent washing/extraction. Biological treatment of PCB's is limited to relatively low PCB concentrations, may act very slowly, and may generate hazardous treatment by-products. Also, biological treatment has not been proven effective for all PCB congeners. Soil washing/extraction must be integrated with other disposal or treatment techniques such as incineration or other alternative dechlorination technologies such as KPEG. These techniques may have high cost and do not generally avoid the environmental and practical disadvantages of thermal or chemical destruction methods.

Ionizing radiation, i.e., x-rays/gamma-rays, electrons, or ions, has been shown to be an effective means of dechlorinating organic compounds. The chemical reactions induced by the ionizing radiation are called radiolysis. In 1974, Sawai, Shinozaki and Shimokawa Bulletin of the Chemical Society of Japan 1974, 47(8), 1889–93 reported the radiolytic dechlorination of PCB's in isopropanol and alkaline isopropanol. Subsequent investigations by Singh showed that in the presence of ionizing radiation, alkaline isopropanol solutions formed radical anions and solvated electrons. The radical anion and the solvated electron reacted with the PCB's in solution. These reactions led to the dechlorination of the compounds. In alkaline solutions, Singh also reported that isopropanol anions lose a proton to form an acetone anion. The acetone anion participates in the stepwise dechlorination of PCB's and produces acetone and biphenyls as the reaction products. Radiolytic dechlorination of PCB's in soil and oil matrices was proposed by Singh based on his experimental results.

In 1991, Mincher et al. Appl. Radiat. Isot. 1991, 42, 1061–1066 showed that stepwise dechlorination of PCB isomers such as 2, 2', 3, 3', 4, 5', 6, 6'-octachlorobiphenyl at concentrations of 42 mg/l in neutral isopropanol solution occurs at applied gamma-ray dose between 20 kilograys (10 kilograys=10 kGy=1 megarad=10 joule/g absorbed energy) and 100 kGy. Mincher also reported that dechlorination of Aroclor 1260 (a PCB mixture) in electrical transformer oil is similar to the mechanism responsible for dechlorination in neutral solutions. Moreover, toxic oxidation byproducts such as dioxin and dibenzofurans are not generated by the reduction reaction in organic solutions. Based on these results, Mincher also proposed radiolytic dechlorination as a method of PCB destruction.

Although the radiolytic dechlorination of PCB's in solution has been well proven, the radiolytic dechlorination of PCB's in soil may require large doses. The large doses lead to higher cost for the treatment process. Although data on the radiolytic dechlorination of PCB's in soil is not presently available, recent research on dioxin (another hazardous halogenated organic compound)contaminated soil is available. Hilaride and Gray Environmental Progress 1994, 28, 2249–58 irradiated soil contaminated with 100 ng/l of 2,3,7,8-tetrachlorodibenzo-p-dioxin (TCDD). In the presence of a surfactant (RA-40, 2%), with 25% moisture, and an applied dose of 800 kGy, approximately 93% of the TCDD was dechlorinated. Soil contaminated with the TCDD was also irradiated in the study. Approximately 55% of the TCDD was dechlorinated with 450 kGy of applied gamma-ray dose. Gray also reported that when electron beams were used instead of gamma-rays or x-rays from Bremsstrahlung sources, radiolytic dechlorination was not observed.

One example of a process for the decomposition of halogenated organic compounds is disclosed in U.S. Pat. No. 4,832,806 to Helfritch. The disclosed process directly irradiates the soil contaminated with the halogenated organic compounds. This process has the disadvantage of requiring large doses of radiation.

Several researchers have investigated solvent washing and extraction processes for recovering PCBs. Such processes can be used to extract the contaminants from the soil for radiolytic treatment of the contaminants without the interference of the soil provided scavengers. Kapila and Clevenger, at a field evaluation in Visalia, Calif., demonstrated an innovative soil washing flotation process for remediation of the soil in a batch process. Excavated soil containing dioxin and poly-cyclic aromatic hydrocarbon (PAH's) compounds from creosote were excavated and placed in processing bins. An alkane-alcohol mixture in a 5:1 ratio was then added to the soil. The alkane used in the experiments was SOLTROL 170 manufactured by the Phillips Petroleum Corporation. The alcohol used in the experiments was butanol, an alcohol with low water solubility. The amount of alkane-alcohol solution added to the soil was 28% by volume. This filled the pores of the soil. The alkane-alcohol mixture was floated out of the soil 12–36 hours after solvent incorporation. The removal efficiency for initial concentrations of 480–610 ng/kg of octachlorodibenzo-p-dioxin was well over 90%. Similar removal efficiencies for PAH concentrations of 630–5800 ng/kg were also reported. The PAH's included phenanthrene, fluoroanthene, pyrene, benzo-a-anthracene, benzo-b-fluoranthene, benzo-d-fluoranthene, chrysene, and dibenz-a-h-anthracene. Additional alkane-alcohol extractions were also shown to reduce further the concentration of contaminants in the soil. Once floated in water, the alkane-alcohol volume emulsified and could be easily separated from the flotation water. This reduced the volume of the contaminant (increased the concentration) by a factor of three.

Overcash et al. Environ. Sci. Technol. 1991, 25, 1479–85 had also shown a similar desorption process using isopropanol that could solubilize TCDD at slightly lower equilibrium concentrations. Partitioning of the TCDD off of the soil surface into the solvent was found to occur in 2–6 hours, typically, when alcohol alone was used as a solvent.

In other prior processes, the radiolytic dechlorination of AROCLOR 1260 (a polychlorinated biphenyl) in electrical transformer oil was shown by Mincher. The results of Mincher and those of Gray's experiments suggest that if the soil or soil-like particles are not present, then the radiolytic dechlorination process would proceed efficiently. Moreover, in this case, the use of electron beams for radiolytic dechlorination of halogenated compounds can be economical.

In previous electron driven radiolysis practice, dose uniformity is achieved by low beam utilization or by 'two-sided' irradiation, i.e., the use of two opposing accelerators. In the case of solid objects to be treated, 'two-sided' irradiation can also be obtained by flipping the solid object over after treatment by an electron beam from one side and treating the opposite side of the object. Both of these approaches result in higher cost for treatment. Use of two accelerators at least doubles the size, complexity, and capital equipment cost of the facility. Flipping the target to be treated is most commonly performed on solid targets and has not been effectively done with multi-component liquids except in recirculating systems in which the material makes many passes. The lack of an inexpensive and easily implemented means to obtain dose uniformity has resulted in a higher cost of treatment. Accordingly, there is a continuing need in the industry for improved processes for treating contaminated soils containing halogenated inorganic compounds.

SUMMARY OF THE INVENTION

An object of the present invention, therefore, is to provide a process for the solvent extraction of halogenated organic compounds that is compatible with and complementary to radiolytic dehalogenation. The solvent extraction process uses short chain alkanes, generally a mixture of $C_6H_x$–$C_{10}H_x$ compounds and a radiolytically advantageous or inert solvent to desorb the halogenated compound from the soil or soil-like particles. The solvent is preferably a lower alcohol that is miscible in water. Examples of suitable solvents include isopropanol, t-butanol and mixtures thereof.

A further object of the present invention is to provide a method of floating the desorbed halogenated compounds and alkane-alcohol mixture to the top of a contaminated volume of solid particulate material that can include soil, sediment, slurry, or sludge so that the alkane-alcohol mixture and contaminant can be removed from the solid particulate material. Thereafter, the mixture containing the contaminants is collected and subjected to ionizing radiation so that radiolytic dehalogenation of the halogenated compounds occurs.

Another object of the present invention is to provide a method for subjecting the halogenated compounds to ionizing radiation with continuous mixing so that a highly uniform radiation dose is applied with high utilization efficiency of the radiation source's output power.

Still another object of the present invention is to provide a method for the efficient radiolytic dehalogenation of the halogenated organic compounds obtained by a solvent extraction/flotation method.

A further object of the invention is to provide a process of extracting halogenated compounds, and particularly polychlorinated biphenyl compounds, from contaminated soil using a solvent extraction medium that does not interfere with radiolytic dehalogenation of the halogenated compounds.

Another object of the invention is to provide a process for dehalogenation of halogenated compounds by directing a beam of ionizing radiation to a thin, turbulent layer of a solvent containing the halogenated compounds.

A further object of the invention is to provide a process for dehalogenating halogenated organic compounds by subjecting the compounds to ionizing radiation while passing the compounds through an apparatus having an outer annular wall and a rotating inner annular wall spaced from the outer wall.

The objects of the invention are basically attained by providing a process for recovering water-insoluble organic compounds from soil, sludge, slurry, sediment material, or mixtures thereof, comprising the steps of contacting a material containing water insoluble organic compounds with a solvent extraction medium for sufficient time to solubilize a substantial portion of the organic compounds into the medium and form a treated mixture, wherein the solvent medium comprises a mixture of a liquid alkane and an alcohol that is compatible with radiolytic dehalogenation, contacting the soil mixture with a sufficient amount of water to separate a substantial portion of the extraction medium from the treated mixture, whereby the extraction medium containing dissolved organic compounds rises to the surface of the water, and separating the extraction medium from the water.

The objects of the invention are further attained by providing a process of the in situ reclamation of water insoluble halogenated organic compounds from contaminated ground, said process comprising the steps of: introducing an extraction medium into a containment area surrounding by an impermeable barrier member in the ground and contacting the contaminated ground for sufficient time to solubilize a substantial portion of the halogenated organic compounds contained therein, wherein the extraction medium is a mixture of an alkane and an alcohol that is compatible with radiolytic dehalogenation, thereafter introducing a sufficient amount of water into the containment area to displace the extraction medium from the ground and to cause the extraction medium to rise to a level above the ground, separating the extraction medium from the water, and subjecting the separated extraction medium to ionizing radiation and dehalogenating the halogenated organic compounds.

Another object of the invention is to provide an apparatus for delivering a substantially uniform ionizing radiation dose to a fluid, the apparatus comprising: an outer containment tank having an outer wall, a fluid inlet and a fluid outlet; an inner drum rotatably mounted in the outer containment tank, the inner drum having a wall spaced from the outer wall to define a substantially annular fluid containment area; a motor for rotating the inner drum with respect to the outer containment tank for producing an azimuthal velocity of fluid in the annular containment area; and an ionizing radiation source for directing ionizing radiation into the annular containment area.

Other objects, advantages, and salient features of the present invention will become apparent from the following detailed description, which, taken in conjunction with the annexed drawings, discloses the preferred embodiments of the present invention.

BRIEF DESCRIPTION OF THE DRAWINGS

Referring to the drawings which form a part of this disclosure.

DETAILED DESCRIPTION OF THE INVENTION

The present invention is directed to a process for extracting and recovering contaminants from soil. More particularly, the invention is directed to a process for separating halogenated compounds from contaminated soil, sediments, slurries and sludges and subjecting the compounds to ionizing radiation under conditions to substantially dehalogenate the compounds with a uniform dose.

The process of the invention in preferred embodiments contacts a volume of soil that contains halogenated organic compounds with a solvent extraction medium for sufficient time to solubilize and desorb the soluble organic compounds in the soil. The solvent extraction medium preferably contains at least one component that is immiscible in water. Thereafter, a volume of water is passed through the volume of soil to separate the solvent extraction medium from the soil. The solvent extraction medium which is immiscible with the water rises to the surface and floats on the surface of the water where it is recovered and subjected to ionizing radiation to dehalogenate the halogenated organic compounds.

The process of the invention is particularly suitable for treating soils contaminated with toxic halogenated organic compounds including, for example, polycyclic aromatic compounds, polychlorinated biphenyl compounds (PCB), and chlorinated dioxin compounds. An example of a polychlorinated biphenyl which can be removed is octachlorobiphenyl.

Figure 1:
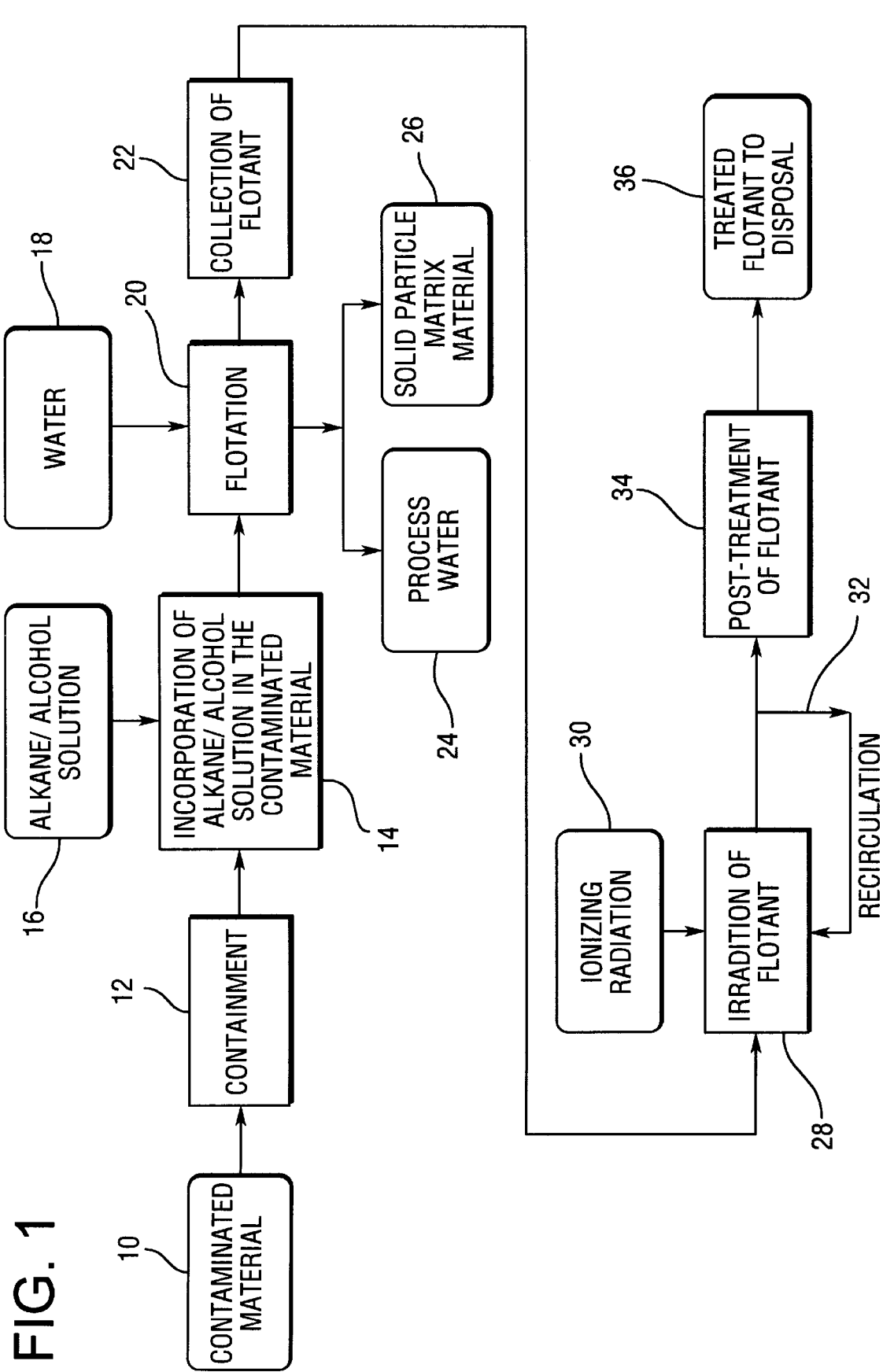
FIG. 1 is a flow chart showing a process of a preferred embodiment of the invention.

Referring to FIG. 1, the general process of a first embodiment of the invention provides a contaminated material indicated in block 10. The contaminated material is typically a volume of soil containing environmentally unacceptable quantities of contaminants, and particularly halogenated organic compounds. In further embodiments, the contaminated material can be, for example, an absorbent material used to absorb toxic chemicals. As used herein, the term contaminated material refers to any solid substrate or material including, but not limited to, soil, rock, particulate adsorbents, and particulate absorbents. The soil can include silt, loam, sand, clay or gravel.

The contaminated material is contained within a containment area indicated by block 12. A supply of an extraction medium mixture indicated by block 14 is added and mixed with the contaminated material as indicated in block 16. In preferred embodiments, the extraction medium is a solvent formed from a mixture of an alkane and an alcohol. After sufficient contact time to allow the contaminants to desorb from the material and solubilize in the extraction medium, water from a source indicated in block 18 contacts the material to separate the extraction medium from the material. The water is added in a sufficient amount whereby the extraction medium floats to the surface of the water as indicated in block 20. The extraction medium containing the contaminants is collected as indicated in block 22 and the process water is discharged as indicated in block 24 and the solid materials discarded as indicated in block 26. The water can be filtered and purified for reuse or discharged.

The extraction medium is then transferred to a treatment zone indicated by block 28 and subjected to ionizing radiation indicated by block 30 to dehalogenate the compounds. The extraction medium can be recirculated to the treatment zone as indicated by loop 32 or passed to a post collection vessel indicated by block 34. Thereafter, the extraction medium can be further processed by filtering or other treatment to remove various compounds and recycled or discarded as indicated in block 36.

The mechanism of radiolytic dehalogenation using ionizing radiation has been extensively studied and those studies are well documented. The mechanism is fairly complex and is known to involve the formation of various ionic species and solvated electrons which produce a chain reaction to remove the halogens from the molecules.

Experimental results of prior processes indicate that the presence of the soil (or similar solid particles in sediment, slurry, or sludge) may provide chemical scavengers that consume the solvated electrons that are believed to participate in the dechlorination reaction process. The competition by the scavengers increases the required dose necessary to dechlorinate the halogenated organic compounds at the soil surface. The large doses required for dechlorination of TCDD in a soil matrix require a large gamma-ray or x-ray source, or a very large electron accelerator facility for even modest TCDD concentrations and modest quantities of contaminated soil, sediment, slurry, or sludge.

It is further believed that the presence of the solid particles will also limit the applicability of the radiolytic dechlorination process to gamma-ray or x-ray sources rather than electron beam sources. This limits the applicability of radiolysis for field use (i.e., on-site and either with excavated soil or in-situ), and where electron accelerators are more desirable than gamma-ray sources because accelerators can be shut off and transported while not producing radiation. For the same reasons, accelerator facilities may be easier to license and maintain than radioactive sources.

In gamma-ray or x-ray radiation, which have high penetrating power that can be several centimeters or even meters, dose uniformity often is dependent mainly on the geometrical presentation to the radiation source of the target material to be treated. Gamma-sources generally have low photon utilization efficiency, but can provide very uniform dose. Also, gamma-ray sources have relatively modest dose rates of a few tens of kilogray per hour, i.e., a few megarads per hour. In this case, the material to be dosed can be recirculated or stirred to further improve dose uniformity.

The prior processes which use accelerator generated electron beams as the ionizing radiation for radiolysis typically do not provide a uniform dose to the PCBs and do not provide for efficient utilization of the electron beam. Multi-mega-electronvolt (MeV) bremsstrahlung x-ray sources become increasingly directional at higher energy, and so, can be used to provide a more uniform dose at high dose rate. However, at energies greater than 10 MeV induced radioactivity poses a limitation on use, and at energies less than 10 MeV, conversion efficiency of electron power to photon power is well below unity and dose uniformity is generally at the expense of photon utilization efficiency. The present invention is directed to a process and apparatus for providing uniform treatment.

In the case of multi-MeV electrons, where the penetration in oil-alcohol solutions is in the range of only a few millimeters up to a few centimeters, the dose non-uniformity may be large. However, such electron beams with average power of up to 100 kilowatts are available. These accelerators are capable of delivering very high dose rates so that material can receive the required dose in one pass as it flows by the radiation field of the accelerator. In this case, the complexity of a recirculation system can be avoided or the number of passes can be small. Because variation of dose along the last 10–50% of the electron range may be more than a factor of 1.5, dose uniformity is needed to obtain the most economical processing.

In the process of the invention, a volume of contaminated soil or solid particle matrix is confined by a non-permeable barrier. If in-situ (e.g., in the ground), the barrier must extend below the contaminated volume and form an enclosure around the sides of the contaminated volume. The barrier on the side must extend above the top of the volume so that a confined area for the extracting solvent is available above the ground. If the contaminated volume is to be treated ex-situ, then it must be excavated and placed in a non-permeable container.

An alkane-solvent mixture is added to and incorporated into the volume of contaminated soil. The amount of the solvent extraction medium added to the soil is preferably sufficient to fill the pores and interstices of the soil. A highly porous soil typically requires a larger volume of extraction medium, while less porous soils may require less. Generally, the extraction medium to soil ratio is about 1:3. In-situ, the solvent mixture is injected through pipes or holes made into the ground. When the ground is sufficiently porous or permeable, the solvent can be poured onto the top surface of the contaminated ground. For ex-situ treatment in the container, the solvent mixture can be poured in at the top or introduced into the container through one or more openings at the bottom. Mixing, shredding, declumping, or maceration of the material can be performed to enhance the dispersion of the solvent mixture throughout the pore volume of contaminated material.

After a suitable waiting time, typically, in the range of 1–36 hours, the halogenated organic compound will partition from the surfaces of the solid particles into the solvent mixture. The time for this to occur can be reduced by heating the soil and solvent mixture. Water is then introduced into the bottom of the volume of contaminated material. Sufficient water is added so that the solvent medium floats to the top of the contaminated soil and into the containment space above the ground so that the solvent medium can be collected.

The solvent medium is collected and placed into a container that is connected to a treatment tank in which the solvent medium flows and is subjected to ionizing radiation. The flow can be induced either by gravity or by the action of a pump. In the case of photon radiation, the tank has a sufficiently thin wall so that it does not significantly attenuate the radiation being applied to the solvent. In the case of electron or other charged particle beam, the wall has a window that is sufficiently thin so that the beam of charged particles can pass through the window with low attenuation. The solvent can be circulated within the treatment tank in the azimuthal direction to provide uniform treatment of the solvent medium. This circulation is driven by a rotating cylinder situated within the treatment tank, and having an axis that is parallel with the axis of the tank. The rate of rotation is sufficiently high so that the azimuthal flow of the solvent medium has a sufficiently high flow velocity and a correspondingly high Reynolds number so that turbulent flow and mixing are obtained. To aid in the development of turbulence, axially oriented wires, cylinders, or vanes may be placed in the azimuthal flow between the rotating cylinder and the wall of the treatment tank so that separation flow occurs and a vortex stream is shed by the wires, cylinders, or vanes.

The solvent is exposed to the ionizing radiation until a sufficient degree of dehalogenation has occurred. The delivered radiation dose may be increased by recirculating the solution through the irradiation treatment tank. After a sufficient dose is delivered, the treated solvent medium is collected in another container. The treated solvent medium is disposed in a final collection container or in another container that is used for transporting the solvent medium to a disposal site.

Figure 2:
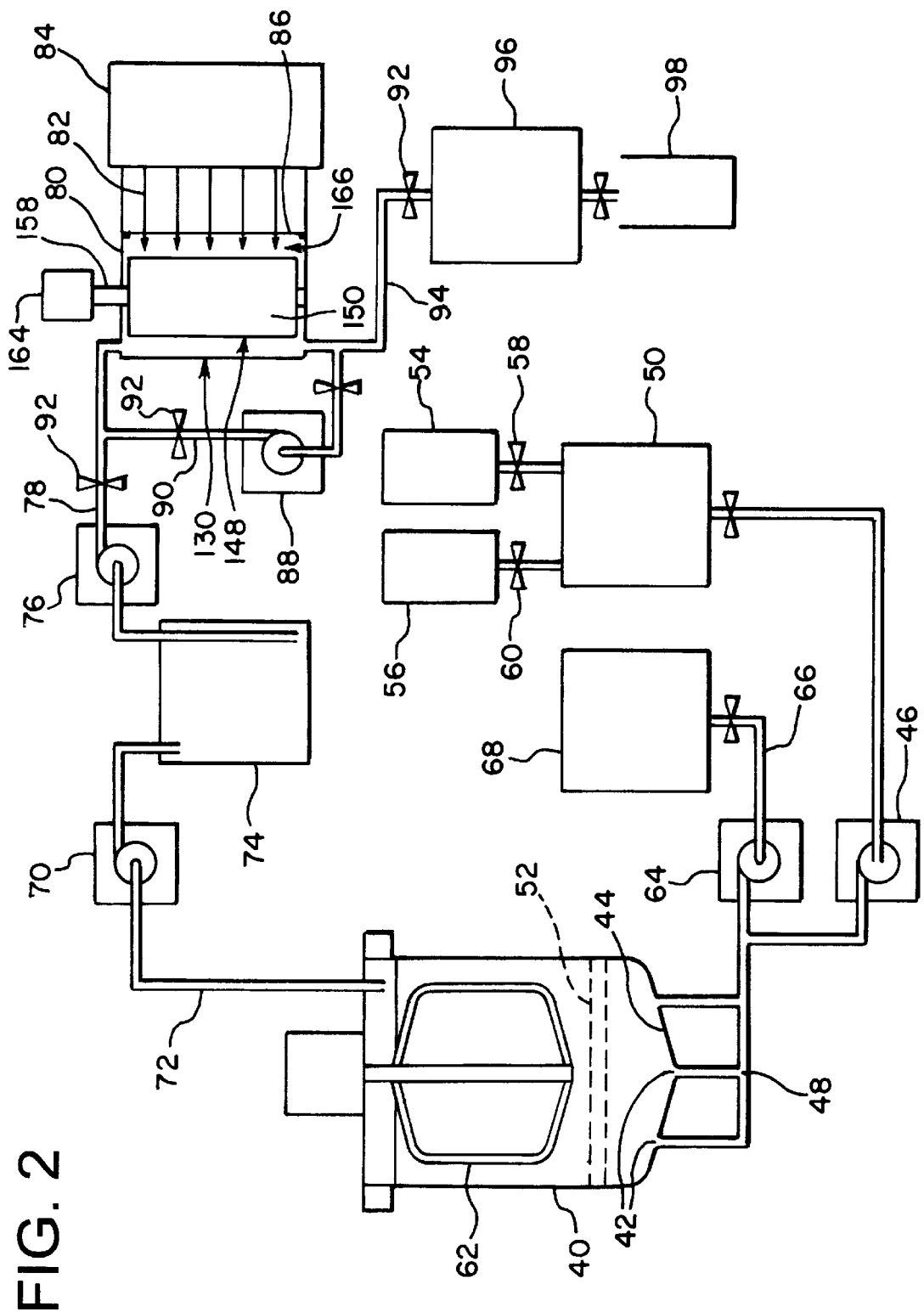
FIG. 2 is a schematic diagram of the apparatus for the ex-situ treatment of contaminated soil.

FIG. 2 shows the schematic diagram of an apparatus for the ex-situ treatment of contaminated material. In this embodiment, the contaminated material is placed in a nonpermeable container 40, which is typically made of metal such as stainless steel. Container 40 has one or more openings 42 in a bottom wall 44 for the introduction of the extraction medium which is pumped by a pump 46 through a pipe 48 from a storage tank 50. The contaminated material is supported on a perforated screen or false bottom 52 in the container 40 so that the extraction medium and water can engulf the material. The components of the extraction medium are stored in tanks 54, 56 and metered through valves 58 and 60, respectively, into the storage tank 50. A mixer 62 is used to break up the clods or clumps and to incorporate the extraction medium into the material when treating materials with low permeability or materials that are prone to clod or clump formation. The mixer 62 is also beneficial for porous and highly permeable materials.

In preferred embodiments of the invention, the extraction medium is a mixture of an alkane and an alcohol. The preferred alkane is a mixture of short chain hydrocarbons $C_6H_x$–$C_{10}H_x$ such as SOLTROL™ 130 manufactured by the Phillips Petroleum Company. The preferred alcohol is isopropanol because it is miscible in water, and it has a high yield in the radiolytic reactions that constitute stepwise dehalogenation of halogenated organic compounds. Isopropyl alcohol has been found to be an effective solvent for PCBs, and does not interfere with the radiolysis. Moreover, it is believed that the isopropyl alcohol produces certain anions which can assist in the dehalogenation of the halogenated organic compounds with minimal scavenging of the solvated electrons. T-butanol can also be used and is found to be inert during the radioloysis of AROCLOR 1260. In preferred embodiments of the invention, the alcohol component is a lower alcohol that is miscible in water and has sufficient solvency to dissolve or solubilize the various contaminants and particularly, the PCBs. Preferably, the alcohol is compatible with the radiolytic dehalogenation reaction and is sufficiently miscible so that at least a portion of the alcohol is extracted into the water as discussed hereinafter in greater detail. It is believed that most of the alcohol used to desorb the contaminant is extracted by the flotation water so that the contaminant is dissolved primarily in the alkane. The ratio of the alkane to the alcohol can vary depending on the alcohol, the porosity of the soil being treated and the particular compounds being extracted. Generally, the alcohol to alkane ratio is about 1:5, but can range from about 1:10 to about 9:10.

Further improvement in the subsequent radiolysis may be obtained by using an alkaline-alcohol solution. The alcohol is made alkaline by the addition of sodium hydroxide or potassium hydroxide. A suitable amount of sodium hydroxide or potassium hydroxide is added to the alcohol to raise the pH by one or two and to provide a sufficient number of sodium or potassium ions in the alcohol that remains in the flotant after the extraction process. The chloride ions produced during the radiolysis will react with the sodium or potassium ions and precipitate from the extraction medium. The removal of the chloride from the extraction medium during radiolysis improves the radiolysis process reaction kinetics by reducing competition reactions.

After the alkane-alcohol mixture is contacted with the contaminated material for a sufficient period of time, typically 1–36 hours, to effect the partition of the contaminant into the extraction medium, flotation water is pumped into container 40 by pump 64 through a pipe 66 from a storage tank 68 or other water supply. The alkane-alcohol-contaminant mixture will separate from the solid material and float to the top of the water. Sufficient water must be introduced into container 40 so that the layer of the extraction medium is above the top surface of the solid materials in container 40 and can be readily separated from the water. As the extraction medium is brought to the top surface, it is removed by draining or by pumping via a pump 70 through a pipe 72 into a collection tank 74.

During or after the collection of the extraction medium in tank 74, some of the medium may be removed by draining or by a pump 76 and carried through pipe 78 to a treatment tank assembly 80. As the medium passes through the treatment tank assembly 80, ionizing radiation indicated by arrows 82 produced by at least one radioactive source or charged particle accelerator 84, preferably a multi-MeV electron accelerator, is directed into the medium through window 86. The ionizing radiation source can be any suitable source as known in the art, such as electron beam, ion beam, x-ray, gamma ray and photon sources. The applied dose of the ionizing radiation during the dehalogenation process is about 1 to about 1000 kilogray. The ionizing radiation source can be, for example, a Co-60 or Cs-137 source, as well as other sources capable of inducing radiolytic dehalogenation.

After dosing the extraction medium as it flows through the treatment tank assembly 80, the extraction medium can be recirculated, if additional dose is needed, by pump 88 through exit/recirculation pipe 90 so that it can be reintroduced into the treatment assembly 80. A number of valves 92 are situated on the input pipe 78, exit/recirculation pipe 90, and an output pipe 94 so that the flow can be directed to the desired location. After a sufficient dose is applied, the material flows through the output pipe 94 to a collection tank 96 and ultimately to a container 98 for disposal.

Figure 3:
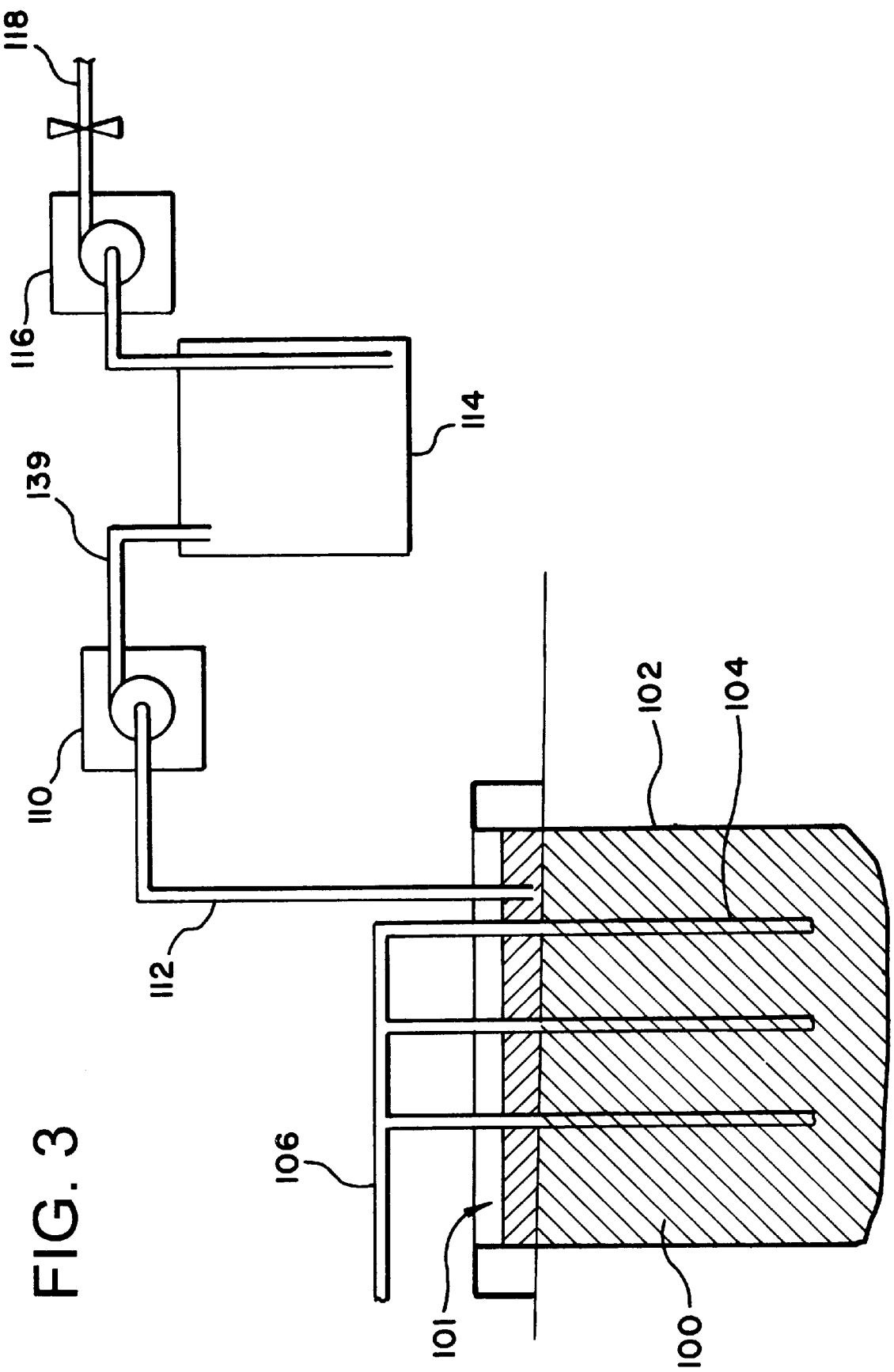
FIG. 3 is a schematic diagram of the apparatus for the in-situ treatment of contaminated soil.

FIG. 3 is a schematic diagram of the process and apparatus for in-situ treatment of contaminated material 100 that has not been excavated, and remains in the ground. In this arrangement, the material 100 is surrounded by a nonpermeable barrier 102 that also extends above the surface of the ground of the contaminated material. The barrier 102 preferably extends upwardly a distance to form a containment area 101 to contain extraction solvent and water. The barrier can be a natural impermeable material such as dense clay or rock. Alternatively, the barrier can be a prepared material such as grout, metal plates, concrete, plastic sheets, rigid panel, or other materials. The barrier can also be formed by injecting water in the soil that is frozen in place by pipes carrying refrigerants or by injecting cooling fluid. Barrier members can be put into place by excavation and back filling techniques, by drilling and insertion, or by impact insertion. The barrier 102 is embedded into the ground to define an encircled area to contain the extraction medium. The barrier 102 is generally embedded to a depth at least equal to the depth of contamination and preferably a depth below the contamination to allow efficient contact of the contaminated soil without the extraction medium leaching into the surrounding areas.

In the embodiment illustrated in FIG. 3, barrier 102 is shown as extending under the contaminated soil of the containment area. The barrier under the containment area can be applied by known techniques, such as, for example, extruding a grouting material. In soils where an impermeable layer, such as clay or rock, lies below the contaminated soil, it is often not necessary to place a barrier along the bottom of the containment area.

After the barrier 102 is in place, one or more pipes 104 are inserted into the soil within the containment area of the barrier 102. The pipes 104 are inserted into the soil to a depth at least equal to the depth of the contamination. An extraction medium is injected under pressure from a supply pipe 106 through injection pipes 104 into the soil in a sufficient amount to dissolve or solubilize the contaminants in the soil.

In embodiments of the invention where the contaminated soil is sufficiently porous and permeable, the extraction medium can be applied to the surface of the ground and allowed to percolate downwardly into the soil. Holes (not shown) can be drilled or dug into the soil and the extraction medium injected into the holes and allowed to percolate into the soil by gravity or under applied pressure.

As in the ex-situ process, the extraction medium is introduced into the contaminated soil material and allowed to contact the soil for a period of several hours. Once sufficient partitioning of the contaminant off of the solid particle surfaces has been achieved, water is introduced through the pipes 106 and 104 into the soil. A sufficient amount of water must be added to fill the containment area whereby the extraction medium rises to the surface of the soil within the containment area.

Once the extraction medium emerges at the surface, it is removed by pump 110 via pipe 112 and collected in a tank 114. During or after collection, extraction medium is drained or pumped by pump 116 through pipe 118 and carried to a treatment apparatus as in the ex-situ arrangement.

Figure 4:
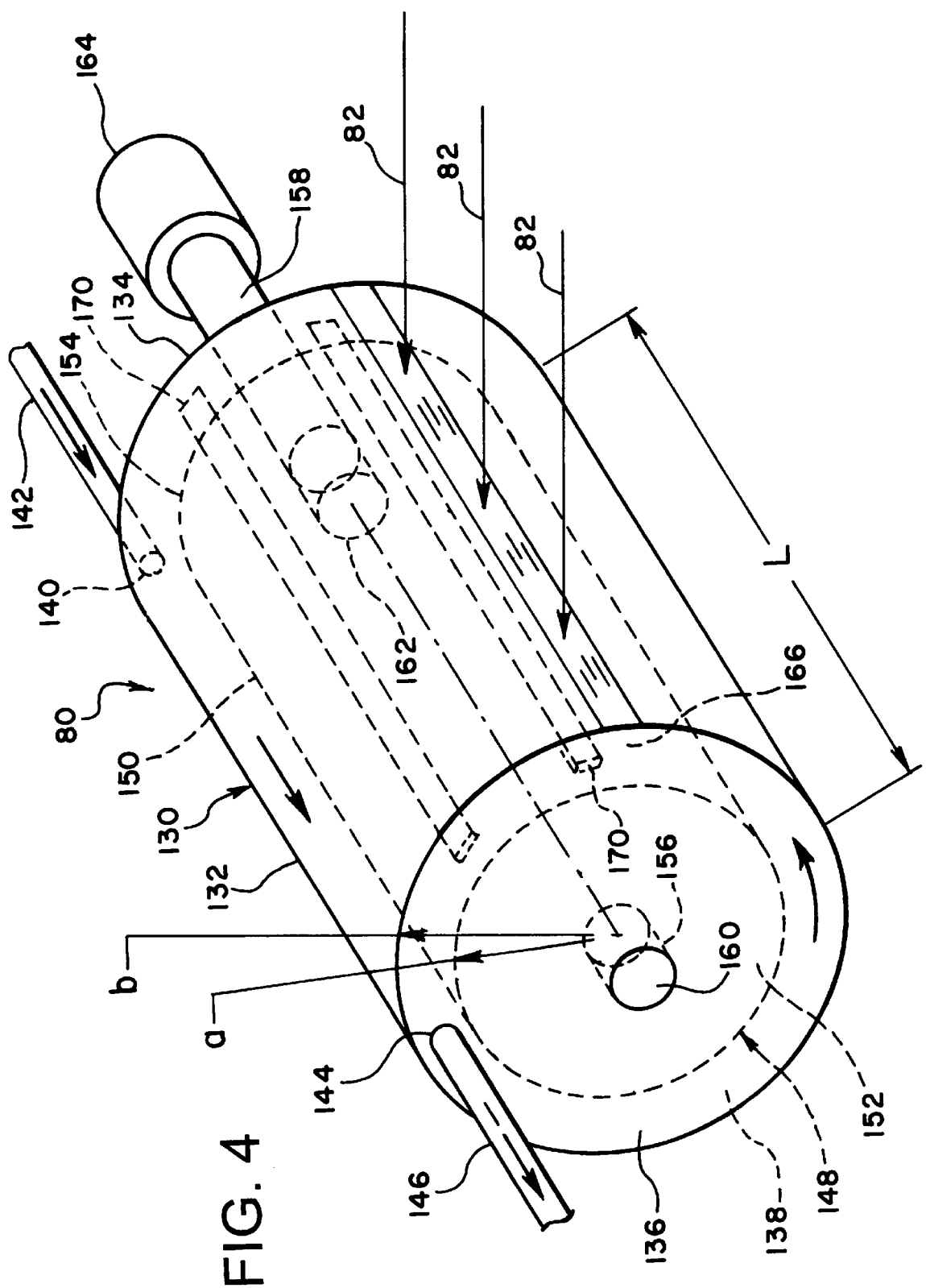
FIG. 4 is a schematic diagram of the irradiating apparatus for inducing turbulent flow mixing.
Figure 5:
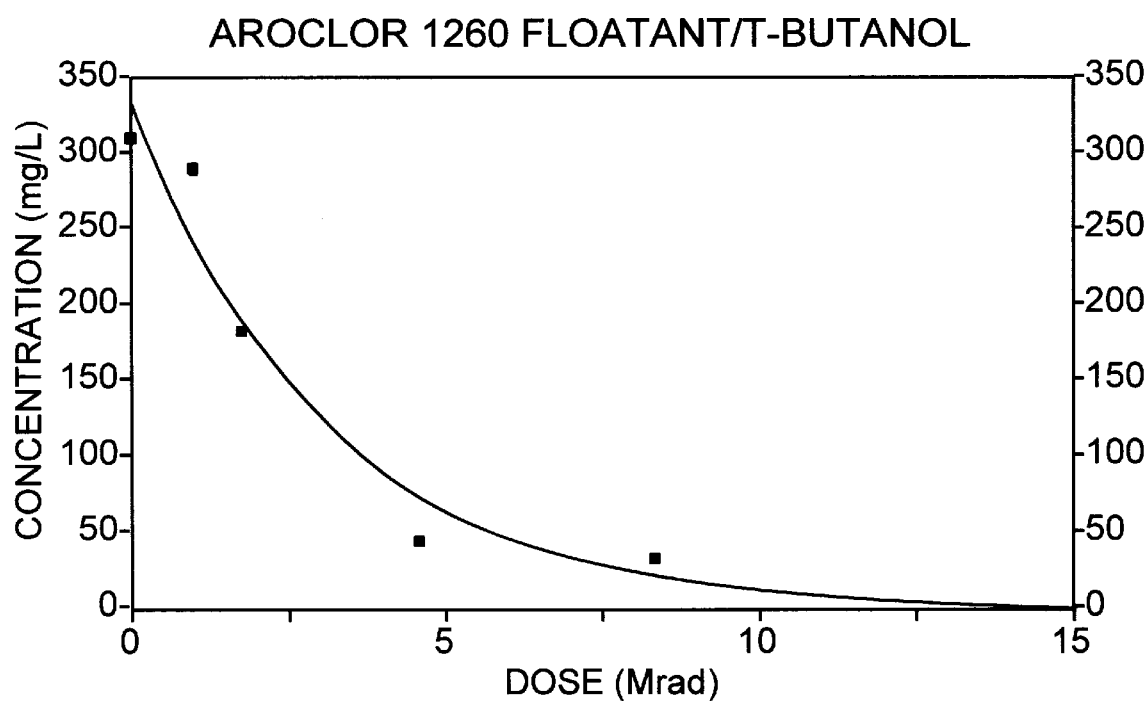
FIG. 5 is a dose-concentration curve for determining the dechlorination rate for AROCLOR 1260 in spiked soil with an initial concentration of 200 mg/kg.
Figure 6:
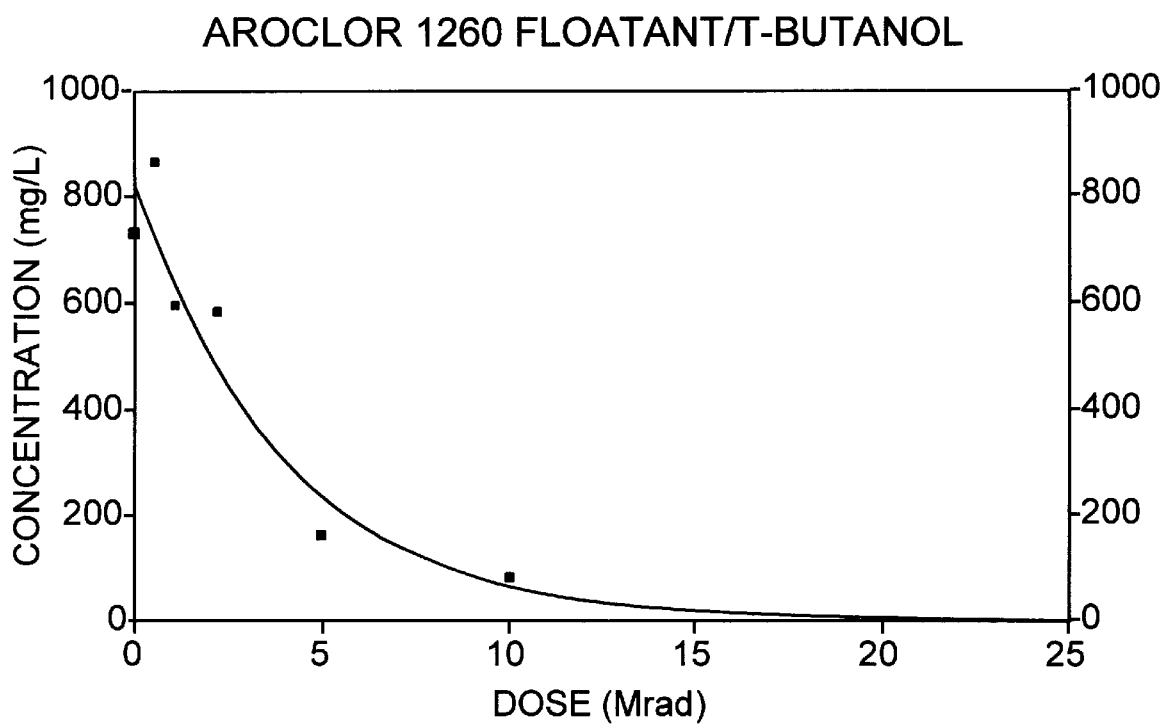
FIG. 6 is a dose-concentration curve for determining the dechlorination rate for AROCLOR 1260 in spiked soil with an initial concentration of 58 mg/kg.
Figure 7:
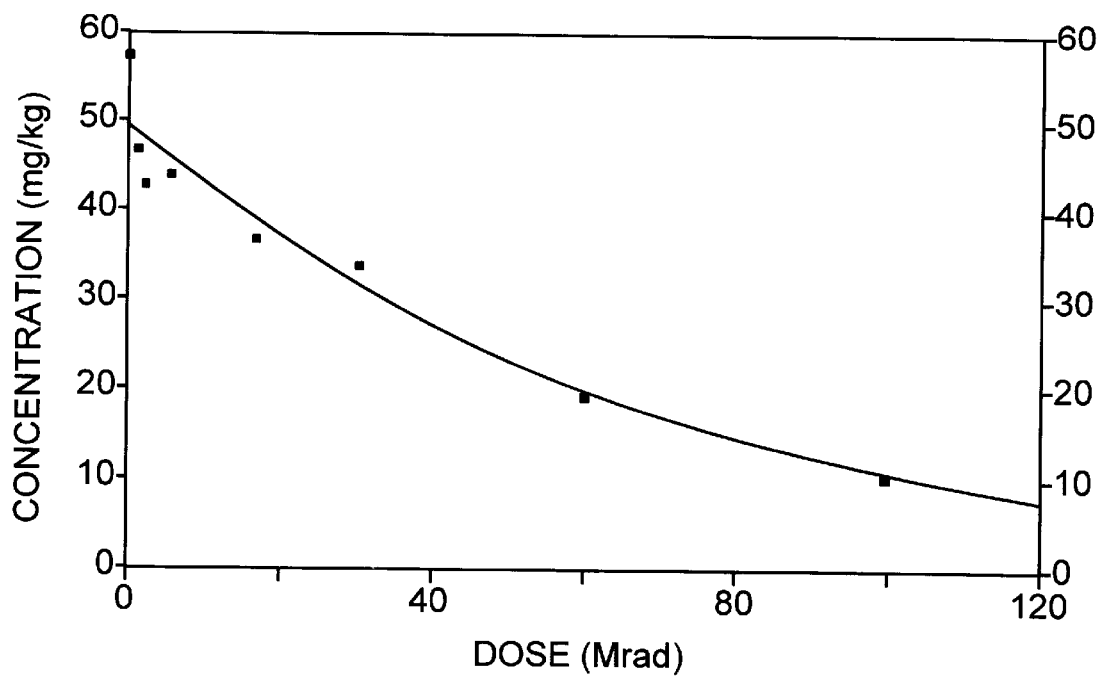
FIG. 7 is a dose-concentration curve for determining the dechlorination rate for AROCLOR 1260 in a SOLTROL 130/t-butanol flotant solution with an initial AROCLOR concentration of 310 mg/kg.
Figure 8:
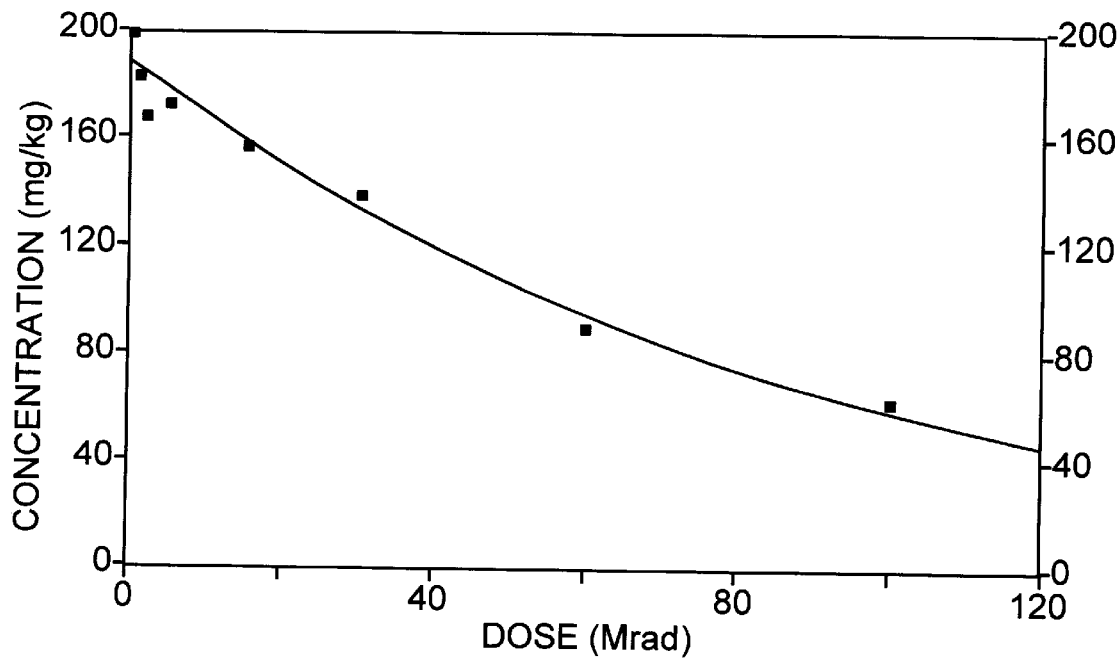
FIG. 8 is a dose-concentration curve for determining the dechlorination rate for AROCLOR 1260 in a SOLTROL 130/isopropanol flotant solution with an initial AROCLOR concentration of 310 mg/kg.
Figure 9:
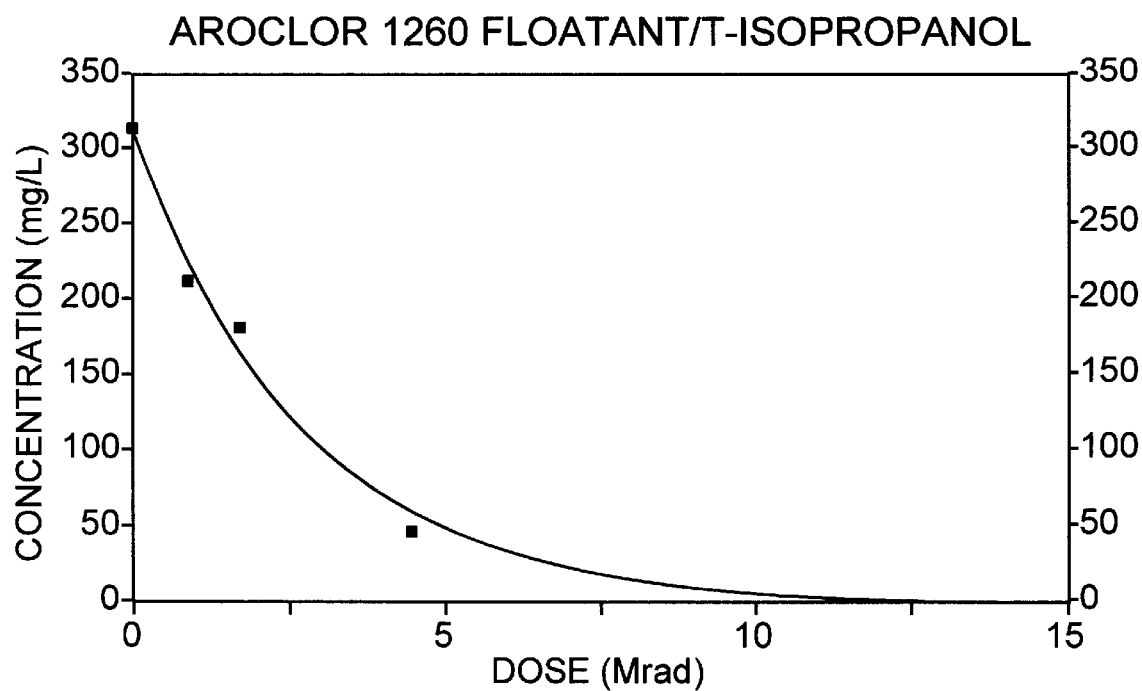
FIG. 9 is a dose-concentration curve for determining the dechlorination rate for AROCLOR 1260 in a SOLTROL 130/t-butanol flotant solution with an initial AROCLOR concentration of 728 mg/kg.
Figure 10:
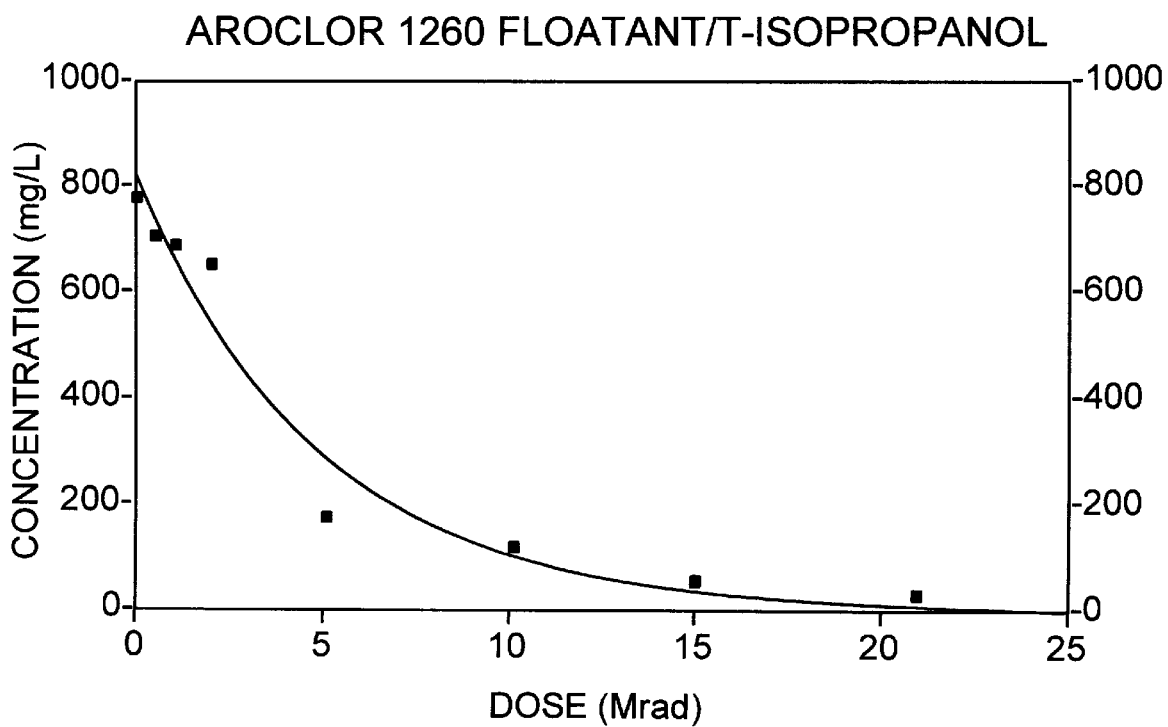
FIG. 10 is a dose-concentration curve for determining the dechlorination rate for AROCLOR 1260 in a SOLTROL 130/isopropanol flotant solution with an initial AROCLOR concentration of 784 mg/kg.
Figure 11:
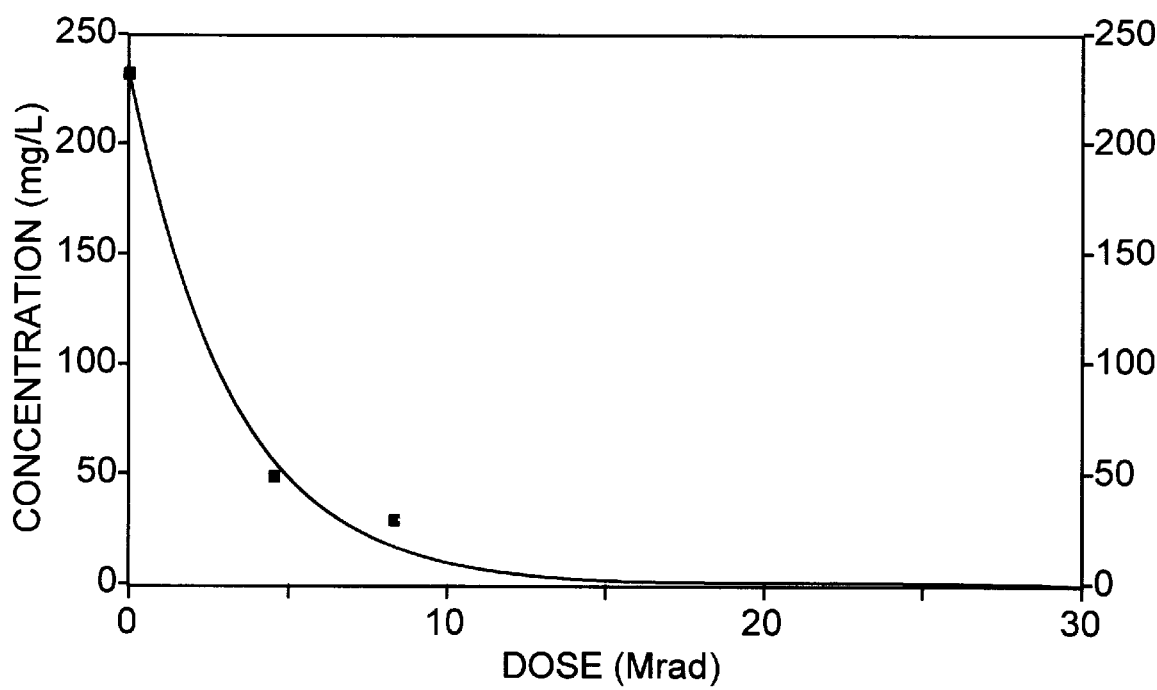
FIG. 11 is a dose-concentration curve for determining the dechlorination rate for an AROCLOR spiked 5:1 solution of SOLTROL 130 and t-butanol flotant solution with an initial AROCLOR concentration of 232 mg/liter.
Figure 12:
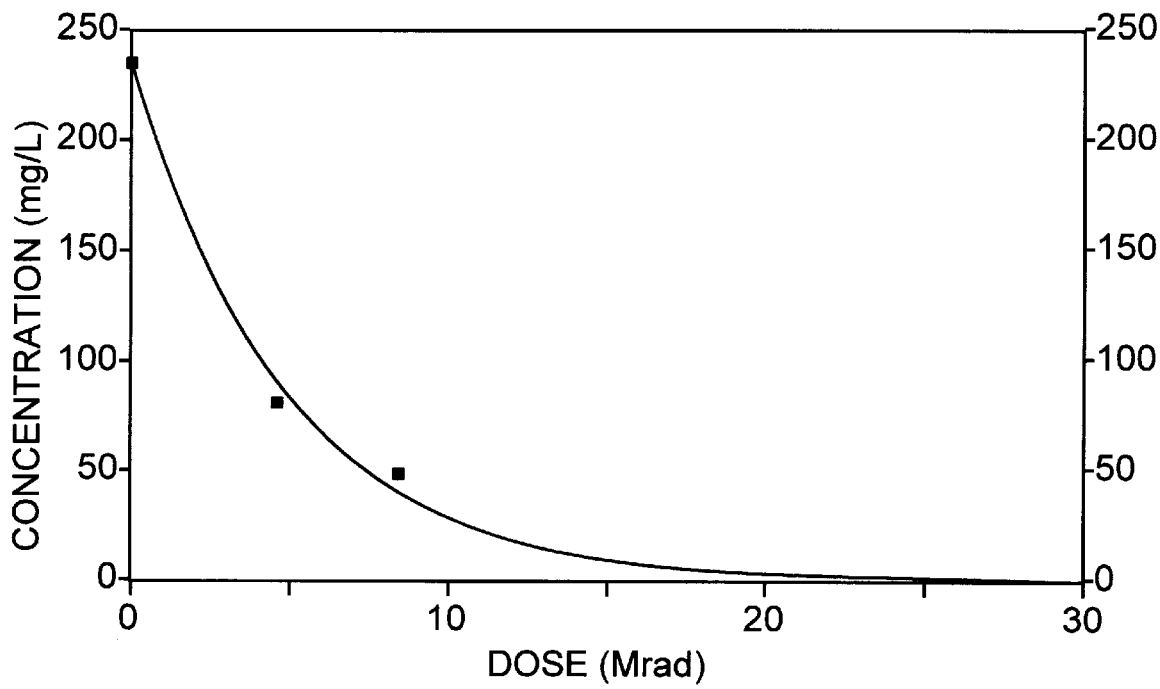
FIG. 12 is a dose-concentration curve for determining the dechlorination rate for an AROCLOR spiked 5:1 solution of SOLTROL 130 and isopropanol solution with an initial AROCLOR concentration of 232 mg/liter.

Referring to FIGS. 2 and 4, the treatment apparatus 80 includes a containment tank 130 having an outer wall 132. Containment tank 130 is generally made of aluminum or stainless steel. In the preferred embodiment, containment tank 130 has a substantially cylindrical configuration having an axial length L and a radius (b). Outer wall 132 typically has a substantially circular shape. In further embodiments, outer wall 132 can have an oval or non-circular shape. Containment tank 130 is closed at each end by end walls 134 and 136 which are coupled to side wall 132 to define a containment area 138. End wall 134 includes an inlet opening 140 for receiving the extraction medium through an inlet pipe 142. End wall 136 includes an outlet opening 144 for discharging treated extraction medium to an outlet pipe 146. In the embodiment illustrated, the inlet opening 140 and outlet opening 144 are coaxially aligned. In alternative embodiments, the inlet opening 140 and outlet opening 144 can be offset from each other. The dimensions of the containment tank can vary as desired. A suitable containment tank has a radius of about 51 cm.

Treatment apparatus 80 further includes an inner drum 148 that is dimensioned to fit within containment tank 130 and to be freely rotatable therein. Inner drum 148 is made of suitable materials such as aluminum or stainless steel and includes a substantially cylindrical inner wall 150 and end walls 152 and 154 coupled to inner wall 150. Inner drum 148 has a radius (a) and a length slightly less than the length of containment tank 130. A suitable radius for inner drum 148 can be about 50 cm. In preferred embodiments, inner drum 148 is completely closed to prevent liquids from entering the inside of inner drum 148. In further embodiments, inner drum 148 can be non-cylindrical, but preferably rotates about a common center axis with containment tank 130.

Inner drum 148 is provided with an axial shaft 156 coupled to end wall 152 and an axial shaft 158 coupled to end wall 154. Axial shaft 156 is mounted in a fluid-tight bearing 160. Axial shaft 158 is mounted in a fluid-tight bearing 162 and is coupled to a drive motor 164 for rotating the inner drum 148 about its center axis within containment tank 130.

Window 86 is provided in outer wall 132 of containment tank 130. In the preferred embodiments, window 86 extends substantially the entire length of outer wall 132 and has a width sufficient to permit the ionization beam to enter the containment tank 130. Window 86 is a suitable material of a thickness to be permeable to the ionizing radiation to allow the radiation such as an electron beam to be transmitted into the treatment apparatus. In one embodiment, window 86 is a thin metal foil having a thickness significantly less than the electron penetration range. Examples of a suitable window is titanium or stainless steel foil having a thickness of about 2 to 200 micrometers for a multi MeV electron beam.

In use, the extraction medium is introduced into a reaction zone 166 formed between the outer wall 132 and the inner drum 148 in the region adjacent to window 86. Rotation of the inner drum 148 causes the extraction medium to flow in a substantially spiral path from the inlet 140 to the outlet 146. Turbulent mixing in this spiral flow ensures uniform exposure to the ionizing beam.

For a given electron beam average power P (in kilowatts) and a required ionizing radiation dose D, typically 20–100 kilogray and dependent on the initial and desired post treatment concentrations of contaminant, the quantity of material M that can be treated in an hour with beam utilization efficiency U is given by the following equation.

$$M = 3.6 \times 10^6 \left(\frac{PU}{D}\right)$$

Typically, the utilization efficiently U is 50% or more. The required ionizing radiation dose is about 20–100 kilogray, although the dose can vary depending on the initial concentration of the contaminants in the medium and the desired final concentration levels. For a 10 kW beam with 50% utilization, a 100 kilogray dose can be delivered to 180 kg of contaminated extraction medium per hour. If the material mass density is approximately unity, i.e., 1 g/cc, then 180 liters per hour can be treated.

The inner drum 148 has an outer radius $\alpha$ and the outer wall 132 has an inner radius b, so that the depth of the annular reaction zone 166 is b–$\alpha$. In preferred embodiments, the inner wall is concentric with the outer wall 132 to provide an annular reaction zone of substantially uniform depth or thickness. In further embodiments, the inner drum can be eccentrically mounted with respect to the containment tank 130 so that the reaction zone 166 has a non-uniform depth. In preferred embodiments, the depth of reaction zone 166 is approximately equal to the electron penetration range in the extraction medium. Typically, the depth is about one centimeter for a 2 MeV electron beam. The reaction zone in the area exposed to the ionizing radiation is about 0.1 to about 10 cm, and preferably about 1 cm. For an apparatus where $\alpha$ is 50 centimeters, and b is 51 centimeters, the reaction zone has a cross sectional area of 317 square centimeters. For a flow rate of 180 liters per hour, this corresponds to an axial flow velocity of 0.16 cm per second. An apparatus having a length L=50 cm, the material has a residence time in the apparatus of approximately 300 seconds.

Turbulent mixing of the extraction medium in the reaction zone requires the Reynolds number, R, for the flow to be greater than 10,000. The Reynolds number is given by $$R = \frac{lu}{v}$$

Where l, u, v are the scale length, azimuthal velocity, and viscosity, respectively. In preferred embodiments, a plurality of vanes 170 are coupled to the outer wall to induce turbulence in the flow. Vanes 170 are generally a planar member positioned in the containment zone 138 about midway between the outer wall 132 and inner wall 150. The vanes can be suspended by brackets coupled to the outer wall or coupled to end walls of the containment tank. Alternatively, a plurality of wires, cylinders or baffles are positioned in the containment zone 138 to induce turbulence. Typically, $l \approx 1$ cm for vanes or wires, 170, arranged axially along the gap to induce vorticity and generate separated flow. The viscosity is approximately 0.02 sq cm per second for the flotant. To obtain a sufficiently large Reynolds number, e.g., 15,000, it is necessary for u to be greater than 300 cm per second. This corresponds to a rotational frequency of 60 rpm when $\alpha$ is 50 cm. This can easily be accomplished with a commonplace motor with a rating of a few horsepower. The power necessary to rotate the inner drum can be determined using standard calculations as disclosed in L. D. Landau and E. M. Lifshitz, Fluid Mechanics, Eddison Wesley, Reading, Mass., pp. 60–61 (1959) and A. Sommerfeld, Mechanics of Deformable Bodies, Academic Press, NY, N.Y., p. 253–262 (1950).

With this apparatus, the slow axial flow is rapidly spun in the azimuthal direction, and turbulent mixing is induced by the rotation of the inner drum. The portion of the extraction medium that received a smaller dose because it was near the end of the electron penetration range is mixed and carried to other radial positions in the reaction zone so that it receives various ionizing radiation doses as it moves past the window. In this manner, the dose is averaged for each element of the fluid.

In the practical application of the process, it is useful to know the dose-constant so that the amount of dose D that is necessary to reduce an initial concentration $C_0$ to a desired post-treatment concentration C. The initial and post-treatment concentrations are related by the following equation:

$$C = C_0 \exp\{-\gamma D\}$$

where $\gamma$ is the dose-constant. If the dose is given in megarads, then the dose-constant has units of 1/megarads.

EXAMPLES

The following is a description of tests performed with AROCLOR 1260 to determine the dose-constant for treatment of PCB by the flotation/extraction and radiolysis process. FIGS. 5–12 show dose-concentration curves for test samples 1–8. The reduction in concentration as dose increases can be fit to an exponential function and the dechlorination rate (dose constant) can be determined. The results of these tests are summarized in Table I. The dose-constant is given by:

$$\gamma = \frac{1}{D} \ln\left(\frac{C_0}{C}\right)$$

TABLE 1

Test Results

| Test Sample | Initial AROCLOR 1260 Concentration | Dose constant (1/(megarad)) |
|---|---|---|
| 1. Spiked soil | 200 mg/kg | 0.011 ± 0.001 |
| 2. Spiked soil | 58 mg/kg | 0.016 ± 0.0025 |
| 3. Flotant/SOLTROL/t-butanol | 310 mg/liter | 0.413 ± 0.108 |
| 4. Flotant/SOLTROL/isopropanol | 310 mg/liter (ppm) | 0.44 ± 0.020 |
| 5. Flotant/SOLTROL/t-butanol | 728 mg/liter | 0.242 ± 0.034 |
| 6. Flotant/SOLTROL/isopropanol | 784 mg/liter | 0.176 ± 0.027 |
| 7. Spiked SOLTROL/t-butanol | 232 mg/liter | 0.194 ± 0.047 |
| 8. Spiked SOLTROL/isopropanol | 232 mg/liter | 0.202 ± 0.007 |

In the these tests, gamma radiolysis was performed using a Co-60 source located at the University of Missouri—Columbia's research nuclear reactor. The Co-60 used was a composite source comprising two weak and two strong sources. Dose rates of 3.1 to 5.7 megarads per hour were delivered. The dose was measured with calibrated radiochromic film FWT-60 purchased from Farwest Technology in Goleta, Calif. The radiochromic film was made into dosimeters and were calibrated at 0.50, 1, 3, and 10 megarads.

Several clean soil samples were spiked with 100 mg/kg and 300 mg/kg of AROCLOR™ 1260 obtained from Fisher Scientific dissolved in iso-octane. Several of the spiked soils were mixed for 24 hours using a tumbler and then allowed to set for 24 hours. A SOLTROL 130 solvent solution containing either 20% isopropanol or 20% t-butanol was added to the soil and allowed to equilibrate for 24 hours. Following the equilibration period, distilled water was pumped upwards through the soil. The SOLTROL 130 alcohol mixture was collected and transferred to a reaction vessel.

After irradiation, liquid samples were diluted 1:500 with hexane and analyzed directly using gas chromatography (GC). A gas chromatograph using a computerized peak and quantification program was used in the analysis. Hexachlorobenzene was used as an internal standard during the analysis. Spike recoveries ranged from 80–120%.

Several of the spiked soil samples were subjected to ionizing radiation without attempting to extract the AROCLOR 1260. The initial concentration of the soil and the results of the dose are shown in Table 1.

The amount of AROCLOR 1260 remaining in each sample after a specific dose was determined and subtracted from the initial amount to measure the amount of dehalogenation and destruction of the PCB. Direct separation of the AROCLOR 1260 from the spiked soil sample was not possible without liquid extraction because of interference from the soil. Soil samples were placed on a column containing 5 g of sodium sulfate, 20 ml of acid silica gel and 5 g of sodium sulfate. Twenty milliliters of methylene chloride was added to the soil sample and allowed to diffuse through the soil samples into the column. After one hour, the extract was slowly drained from the column. The column was rinsed with 10 ml of methylene chloride, and the solution collected. Three milliliters of hexane and 0.2 ml of SOLTROL 130 were added to the soil. The extract- SOLTROL-hexane was rotary evaporated, leaving the AROCLOR 1260, hexane, and SOLTROL. The samples were then diluted to a final volume of 10 ml using hexane. The aliquot was analyzed using the gas chromatographic procedures described above to determine the amount of AROCLOR remaining in the soil sample after each dose.

The summary of the tests is given in Table I. The floated solutions containing AROCLOR 1260 had the highest dose constant. This indicates the highest rate of dechlorination of the samples tested. Analysis of the tests show that the radiolytic dechlorination of AROCLOR 1260 in the test sample observe first order rate kinetics. In all of the test data, a plot of the natural logarithmic decomposition rate vs absorbed dose was found to be linear, which indicates first order rate reaction. The slope of the curve is the dose constant. The higher the dose constant, the more efficient is the dechlorination process.

FIGS. 5–12 show the concentration vs dose curves for the various test samples 1–8. It is seen that a dose on the order of 100 megarads (1000 kGy) is necessary to obtain a modest reduction in the PCB concentration in the spiked soil samples. In contrast, when the AROCLOR is desorbed from the soil surface and then extracted using the flotation process of the invention, the dose constant and efficiency increases by up to a factor of 40. The flotation process removes the AROCLOR from the soil and reduces the scavenging of the solvated electron. At higher concentrations it is found that the dose constant is less than at low concentrations. This suggests that the rate of dechlorination has a concentration dependence and decreases as the concentration increases.

In both the SOLTROL 130 t-butanol tests and the SOLTROL 130-isopropanol test, 30% by volume of the SOLTROL-alcohol solution was added to the soil. Following flotation, approximately 75–80% of the AROCLOR 1260 was removed from the soil in a single flotation. Mass balance also indicated that 80–85% of the SOLTROL-alcohol solution added to the soil was recovered after flotation. This indicates that the alcohol in the SOLTROL-alcohol solvent partitions into the flotation water. Within the resolution of the analysis, the process was found to concentrate the AROCLOR 1260 by a 3:1 volume in the flotant as calculated. This suggests that the flotation process is also a candidate for volume reduction of contaminants at remediation sites.

For comparison, tests were made with SOLTROL solutions of the two alcohols in a 5:1 concentration that were spiked with AROCLOR 1260. These solutions were not exposed to soil. As seen in Table I, the dose constants for these tests were approximately a factor of two lower than for the flotated solutions.

In iso-octane, and alkane similar to SOLTROL 130, both geminate and solvated electrons were found to participate in the radiolytic dechlorination of the PCB's this is believed to account for the concentration dependence in dechlorination vs dose. In neutral isopropanol, the electrons become solvated, however, and the dechlorination rate is independent of PCB concentrations. In the spiked SOLTROL-alcohol solutions, the process is mixed and competition kinetics suggests that the presence of an alcohol can compete for radiolytically generated electrons. This is consistent with the observed test results. In the floated solution, the alcohol is believed to be scavenged by the water used for flotation, thereby leaving behind the AROCLOR 1260 and the SOLTROL 130. When the flotant is irradiated, the reaction kinetics are similar to that of an iso-octane solution. However, when a spiked solution containing AROCLOR 1260 in a SOLTROL 130-alcohol solution is irradiated, the polar alcohol in solution solvates the radiolytically generated electrons, decreasing the efficiency of the reaction and thus lowering the dose constant. This suggests that a flotation process that uses an alcohol miscible in water is more efficient than a flotation process that uses an immiscible alcohol.

Although various embodiments have been selected to demonstrate the invention, it will be understood by those skilled in the art that various modifications can be made without departing from the scope of the invention as defined in the appended claims.

What is claimed is:

1. A process for seperating water-insoluble organic compounds from soil, sludge, slurry, sediment material, or mixtures thereof, comprising the steps of contacting a material containing water insoluble organic compounds with a solvent extraction medium for sufficient time to solubilize a substantial portion of said organic compounds into said medium and form a treated mixture, wherein said solvent medium comprises a mixture of a liquid alkane and an alcohol that is compatible with radiolytic dehalogenation, contacting said soil mixture with a sufficient amount of water to separate a substantial portion of said extraction medium from said treated mixture, whereby said extraction medium containing dissolved organic compounds rises to the surface of said water, separating said extraction medium from said water, and subjecting said extraction medium to ionizing radiation.

2. The process of claim 1, wherein said organic compounds are halogenated organic compounds.

3. The process of claim 1, wherein said alkane is a mixture of $C_6$–$C_{10}$ alkanes.

4. The process of claim 1, wherein said alcohol is isopropyl alcohol, t-butanol or mixtures thereof.

5. The process of claim 1, wherein said extraction medium comprises a $C_6$–$C_{10}$ alkane and isopropyl alcohol in a ratio of about 1:10 to about 9:10.

6. The process of claim 1, comprising contacting said soil with an amount of said extraction medium to substantially fill a pore volume of said material.

7. The process of claim 1, wherein said extraction medium further contains sodium hydroxide, potassium hydroxide, or mixtures thereof.

8. The process of claim 1, comprising contacting said extraction medium with said material for about 1–36 hours.

9. The process of claim 1, wherein said halogenated compounds are selected from the group consisting of polychlorinated biphenyls, chlorinated dioxins, and mixtures thereof.

10. A process of the in situ separation of water insoluble halogenated organic compounds from contaminated ground, said process comprising the steps of:

introducing an extraction medium into contaminated ground in a containment area surrounded by an impermeable barrier member in the ground and contacting said contaminated ground for sufficient time to solubilize a substantial portion of said halogenated organic compounds contained therein, wherein said extraction medium is a mixture of an alkane and an alcohol that is compatible with radiolytic dehalogenation, thereafter introducing a sufficient amount of water into said containment area to displace said extraction medium from said ground and to cause said extraction medium to rise to a level above said ground, separating said extraction medium from said water, and subjecting said separated extraction medium to ionizing radiation and dehalogenating said halogenated organic compounds.

11. The process of claim 10, further comprising positioning said impermeable barrier member in the ground to define said containment area.

12. The process of claim 11, wherein said barrier is a plastic sheet or rigid panel embedded into the ground.

13. The process of claim 11, further comprising the step of excavating an area around said contaminated area, positioning said barrier in said excavated area, and backfilling said excavated area to retain said barrier in place.

14. The process of claim 10, comprising injecting said extraction medium into said ground to a depth at least equal to a depth of said contaminated ground.

15. The process of claim 10, comprising injecting said water into said ground to a depth at least equal to the depth of said contaminated ground.

16. The process of claim 10, comprising introducing said separated extraction medium into a treatment apparatus, wherein said apparatus includes a substantially cylindrical outer wall and a substantially cylindrical inner wall spaced from said outer wall to define a substantially annular treatment zone, said process comprising introducing said extraction medium into a fluid inlet at a first end of said apparatus and to a fluid outlet at a second end, and subjecting said extraction medium in said treatment zone to said ionizing radiation.

17. The process of claim 16, wherein said outer wall includes an ionizing radiation permeable window and an ionizing radiation source for introducing ionizing radiation into said annular treatment zone.

18. The process of claim 17, wherein said window extends substantially the entire length of said treatment zone.

19. The process of claim 16, wherein said annular treatment zone has a thickness of about 0.1 to about 10 cm.

20. The process of claim 16, comprising rotating said inner annular wall about a longitudinal axis to mix said extraction medium and direct said extraction medium across said window while being subjected to said ionizing radiation.

21. The process of claim 16, comprising subjecting said extraction medium to ionizing radiation at an applied dose of about 1 to about 1000 kilogray.

22. The process of claim 16, wherein said inner wall is coaxial with said outer wall.

23. The process of claim 16, further comprising a turbulence producing device in said annular treatment zone for introducing turbulence in fluid contained in said treatment zone.

24. The process of claim 23, wherein said turbulence producing device is a vane, wire or cylinder positioned in said annular treatment zone.

25. The process of claim 16, comprising rotating said inner wall with respect to said outer wall.

26. The process of claim 10, wherein said alcohol is selected from the group consisting of isopropanol, t-butanol and mixtures thereof.

27. The process of claim 10, wherein said alkane is a mixture of $C_6$–$C_{10}$ alkanes.

28. The process of claim 10, wherein said extraction medium comprises a $C_6$–$C_{10}$ alkane and isopropyl alcohol in a ratio of about 1:10 to about 9:10.

29. The process of claim 10, comprising contacting said ground with an amount of said extraction medium to substantially fill a pore volume of said material.

30. The process of claim 10, wherein said extraction medium further contains sodium hydroxide, potassium hydroxide, or mixtures thereof.

31. The process of claim 10, comprising contacting said material with said extraction medium for about 1–36 hours.

32. The process of claim 10, wherein said halogenated compounds are selected from the group consisting of polychlorinated biphenyls, chlorinated dioxins, and mixtures thereof.

33. A process for seperating water-insoluble organic compounds from soil, sludge, slurry, sediment material, or mixtures thereof comprising the steps of injecting a cooling fluid into the ground to freeze water in said ground to form an impermeable barrier, contacting a material containing water insoluble organic compounds within said impermeable barrier with a solvent extraction medium for sufficient time to solubilize a substantial portion of said organic compounds into said medium and form a treated mixture, wherein said solvent medium comprises a mixture of a liquid alkane and an alcohol that is compatible with radiolytic dehalogenation, contacting said soil mixture with a sufficient amount of water to separate a substantial portion of said extraction medium from said treated mixture, whereby said extraction medium containing dissolved organic compounds rises to the surface of said water, separating said extraction medium from said water, and subjecting said extraction medium to ionizing radiation.

* * * * *